United States Patent Office 2,795,546
Patented June 11, 1957

2,795,546

LUBRICATING GREASE COMPOSITIONS CONTAINING O,N-DIACYL-p-AMINOPHENOLS

David W. Young, Westfield, Arnold J. Morway, Rahway, and Delmer L. Cottle, Highland Park, N. J., assignors to Esso Research and Engineering Company, a corporation of Delaware No Drawing. Application December 20, 1951, Serial No. 262,666

7 Claims. (Cl. 252—42.1)

This invention relates to lubricating grease compositions. Particularly the invention relates to lubricating compositions having outstanding oxidation resistant properties. More particularly the invention relates to a lubricating grease composition comprising a lubricating grease containing combined therein a minor proportion of an O,N-diacyl-p-aminophenol as an oxidation inhibitor.

It is a common practice in the art of manufacturing lubricating grease compositions to increase the resistance of the greases to oxidation by incorporation of substances known as "oxidation inhibitors." There are various oxidation inhibitors known to the art, examples being such materials as phenyl-alpha-naphthylamine, phenyl-beta-naphthylamine, phenolic type compounds, complex amine intermediates and the like. It has now been found that grease compositions containing minor amounts of O,N-diacyl-p-aminophenols have outstanding characteristics in regard to oxidation stability and also superior oil retention properties.

The O,N-diacyl-p-aminophenolic derivatives contemplated for use in the grease compositions of this invention have the following general structure:

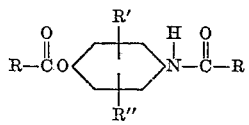

wherein the R's are alkyl groups containing from 2 to 24 carbon atoms, alike or different, preferably non-benzenoid in nature, and R' and R'' are hydrogen atoms or alkyl groups.

The preferred embodiment of the invention contemplates the use of compounds according to the formula above where R is an alkyl group containing from 8 to 20 carbon atoms and R' and R'' are hydrogen, i. e., the O,N-diacyl-p-aminophenols. However, the alkylated diacyl-p-aminophenols, exemplified by the formula above, R' and R'' being alkyl groups containing from 1 to 20, preferably 4 to 18 carbon atoms, are also very satisfactory as oxidation inhibitors.

Exemplary of the alkylated diacyl-p-aminophenols operable are:

O,N-dilauroyl-3-pentadecyl-p-aminophenol
O,N-dilauroyl-2-tert. butyl-p-aminophenol
O,N-dilauroyl-2,6-di-tert. butyl-p-aminophenol
O,N-dilauroyl-2-isopropyl-p-aminophenol
O,N-distearoyl-2-tert. butyl-p-aminophenol
O,N-distearoyl-2-isooctyl-p-aminophenol
O,N-dicapryl-2-isopropyl-p-aminophenol, etc.

The preparation of these diacyl-p-aminophenols is achieved by admixing the desired acid chloride with p-aminophenol and heating the mixture under proper conditions. The reaction progresses smoothly, giving off hydrogen chloride and the desired diacylated-aminophenol which may be purified by any of the various methods known to the art such as distillation, crystallization, extraction, etc.

The following is exemplary of the method of preparation of the O,N-diacyl-p-aminophenols.

There were added to 50 g. of toluene 54.5 g. of para-aminophenol and 151 g. of stearoyl chloride, a mol to mol ratio. The mixture was heated on a steam bath for about one hour, after which time the reaction was complete. The product was filtered, washed with 1:1 isopropyl alcohol-water mixture and dried. There were obtained 56.8 g. of a product having a melting point of 131° C. Upon analysis it was shown that the product contained 2.28% N, 78.56% C, and 12.19% H.

There were also prepared samples of O,N-dilauroyl-p-aminophenol, and O,N-dilauroyl-3-pentadecyl-p-aminophenol. It has been generally found that whenever the acid chloride is reacted with the p-aminophenol, the O,N-diacyl-p-aminophenol results, even though the ratio of p-aminophenol to the acid chloride is as high as 2:1.

The grease compositions of this invention may be prepared by dispersing any of the common grease-making soaps in a lubricating oil, using sufficient quantities of the desired soaps to form grease compositions of varying consistencies. Oxides or hydroxides of any of the various alkaline earth or alkali metals such as calcium, strontium, barium, potassium, sodium, or lithium may be used to form the soaps of any of the well known grease-making acidic materials, exemplified by hydrogenated fish oil acids, stearic acid, hydroxystearic acid, oleic acid, palmitic acid, lauric acid, tallow, coconut oil, the saturated or unsaturated glycerides of the various fatty acids or mixtures of these in any proportion.

The oil base in which the above mentioned soaps may be dispersed may be selected from either the naturally occurring mineral oil distillates treated by any of the modern refining techniques or a synthetic lubricating oil such as the long chain aliphatic esters, esters of dibasic acids such as sebacates, adipates and the like, polymerized cracked wax, acylated aromatics, polyglycol esters, polyglycol ethers, polyglycol ether esters, and the like.

The grease composition of this invention may be prepared by any of the procedures with which the art of grease manufacture is well familiar. For instance, a preformed soap may be admixed with a small proportion of the desired lubricating oil base, heated to the melting point of the soap with stirring and the remainder of the mineral oil then added and allowed to cool. Or, if it is desired, the soap may be prepared in situ by admixing with a minor proportion of the oil the desired amount of the acidic material, forming the soap by adding the calculated equivalent of the desired metallic hydroxide, raising the temperature of the mixture to drive off the water formed, adding the remainder of the mineral oil and allowing it to cool to handling temperature. These methods are well known in the art and do not form a part of this invention.

The desired amount of the oxidation inhibitor may be added to the grease composition at any stage of its manufacture. It is usually preferred to add from 0.025% to 2% of the acyl-p-aminophenol with 0.1% to 1% being especially preferred in most formulations. If the oxidation inhibitor is being added to a preformed grease it is advantageous to first dissolve the O,N-diacyl-p-aminophenol in a naphthenic oil and then incorporate the solution into the grease composition that is slightly warm. When it is desired to add the O,N-diacyl-p-aminophenol during the preparation of the grease composition, this presolubilization is unnecessary and the compound may be added preferably after the soap has been formed.

In the preferred embodiment of this invention the following procedure is used:

A portion of the lubricating oil is admixed with the fatty material in a grease kettle equipped for heating by a steam jacket or by a direct flame. A solution of the desired metal, usually in the form of a metallic hydroxide, is then added to the mixture with stirring. The temperature of the mixture is then raised to about 400 to 420° F. At that point the balance of the lubricating oil and the additive materials are added. Heating is then stopped. The resulting composition is then pan cooled or cooled in a continuous grease cooler according to standard procedures.

EXAMPLE I

A lubricating grease composition, according to the concept of this invention, was prepared by the procedure detailed above from the following formulation:

| | Percent |
|---|---|
| Rapeseed oil | 29.00 |
| Sodium hydroxide | 5.92 |
| Sodium petroleum sulfonate | 0.50 |
| O,N-dilauroyl-p-aminophenol | 1.00 |
| Coastal distillate having a viscosity at 210° F. of 55 S. U. S. and a V. I. of 50 | 63.58 |

EXAMPLE II

A second experimental grease was prepared by the procedure and formulation used in Example I except that O,N-distearoyl-p-aminophenol was the oxidation inhibitor added.

EXAMPLE III

A third experimental grease was prepared as in Examples I and II above except that in this case O,N-dilauroyl-3-pentadecyl-p-aminophenol was the oxidation inhibitor added.

The experimental greases prepared in Examples I, II, and III above were then subjected to the standard Norma-Hoffman oxidation bomb test. This oxidation test is well described in the patent literature and involves subjecting a given sample of a grease to a constant temperature, usually 100° C., under an oxygen pressure of 110 p. s. i. The loss in oxygen pressure is a function of the oxidation resistance of the grease, that is to say, a grease that is highly resistant to oxidation will show only a small pressure drop after an extended period of test time. The results of the tests on these experimental greases are shown in Table I below. Included in the data on Table I are comparative test data obtained by subjecting an identical grease formulation containing, instead of the O,N-diacyl-p-aminophenols, a commercially available oxidation inhibitor, phenyl-alpha-naphthylamine.

*Table I*

O,N-DIACYL-P-AMINOPHENOLS AS GREASE ANTIOXIDANTS NORMA-HOFFMAN BOMB TESTS

| Percent Antioxidant | Name | Hrs. to 10 lbs. Pressure Drop | Hrs. to 25 lbs. Pressure Drop |
|---|---|---|---|
| None | | 56 | 125 |
| 1 | Phenyl-alpha-naphthylamine | 220 | 405 |
| 1 | O,N-dilauroyl-p-aminophenol | 648 | 900 |
| 1 | O,N-distearoyl-p-aminophenol | 500 | 620 |
| 1 | O,N-dilauroyl-3-pentadecyl p-aminophenol | 475 | 700 |

One of the common failings of oxidation inhibitors is their instability to deterioration caused by sunlight. Grease compositions containing them, therefore, darken upon exposure and lose their desired light color. The experimental greases and the grease formulation containing the commercial inhibitor were subjected to 40 hours of ultraviolet light exposure and their resulting color change reported on the following bases. Black was given a rating of 10 and no color change was rated 0. The results of this test are set out in Table II below:

*Table II*

LIGHT STABILITY TEST

| Grease Sample | Stability Rating* |
|---|---|
| Example I: (O,N-dilauroyl-p-aminophenol) | 0 |
| Example II: (O,N-distearoyl-p-aminophenol) | 0 |
| Example III: (O,N-dilauroyl-3-pentadecyl-p-aminophenol) | 0 |
| Grease with phenyl alpha-naphthylamine | 4 |

*Rating scale: 0=no color change after 40 hours exposure to ultra violet light; 10=black after 40 hours exposure to ultra-violet light.

It is to be seen from the data in Table II above that the greases of this invention were outstanding in their resistance to discoloration due to ultra-violet light.

It may be desired to add to the grease composition of this invention other of the well-known additive materials such as tackiness agents, corrosion inhibitors, other oxidation inhibitors, detergents and the like. This may be done with impunity in the greases of this invention since the O,N-diacyl-p-aminophenols are perfectly compatible with these additive materials.

To recapitulate briefly, this invention relates to lubricating grease compositions having outstanding characteristics of oxidation resistances which comprise a lubricating oil, either naturally occurring or synthetic, thickened to a grease consistency with the metal soap of a fatty acid and which contain combined therein in a minor proportion of a compound having the general formula:

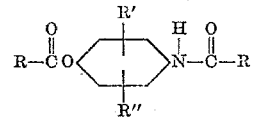

wherein R is a non-benzeoid group containing from 2 to 24 carbon atoms, preferably from 8 to 20 carbon atoms, and R' and R" are hydrogen atoms or alkyl groups containing from 1 to 20, preferably 4 to 18 carbon atoms. The oxidation inhibitor may be added to the grease composition at any stage of its manufacture or it may be dissolved in a naphthenic oil and added to a finished grease with working at moderate temperatures.

What is claimed is:

1. A lubricating grease composition consisting essentially of a lubricating oil thickened to a grease consistency with a metal soap of a fatty acid having combined therein a minor, but oxidation resistance improving amount, of a compound having the formula

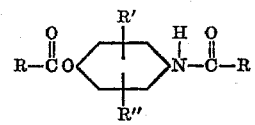

wherein R is an alkyl group having from 2 to 24 carbon atoms and wherein R' and R" are selected from the class consisting of hydrogen and alkyl groups containing from 1 to 20 carbon atoms, said metal being selected from the group consisting of alkali metals and alkaline earth metals.

2. A lubricating grease composition consisting essentially of a lubricating oil thickened to a grease consistency with a metal soap of a fatty acid having combined therein a minor, but oxidation resistance improving amount, of a compound having the formula

wherein R is an alkyl group having from 8 to 20 carbon atoms, said metal being selected from the group consisting of alkali metals and alkaline earth metals.

3. A lubricating grease composition consisting essentially of a mineral lubricating oil thickened to a grease consistency with a metal soap of a fatty acid having combined therein a minor, but oxidation resistance improving amount, of a compound having the formula

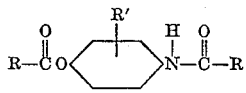

wherein R is an alkyl group having from 8 to 20 carbon atoms, and wherein R' is selected from the class consisting of hydrogen and alkyl groups containing from 4 to 18 carbon atoms, said metal being selected from the group consisting of alkali metals and alkaline earth metals.

4. A lubricating grease composition consisting essentially of a mineral lubricating oil thickened to a grease consistency with a metal soap of a fatty acid having combined therein a minor, but oxidation resistance improving amount, of a compound having the formula

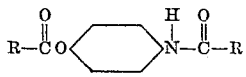

wherein R is an alkyl group having from 16 to 20 carbon atoms, said metal being selected from the group consisting of alkali metals and alkaline earth metals.

5. A lubricating grease composition consisting essentially of a mineral lubricating oil thickened to a grease consistency with the sodium soap of rapeseed oil having combined therein from 0.025% to 2% by weight of O,N-dilauroyl-p-aminophenol.

6. A lubricating grease composition consisting essentially of a mineral lubricating oil thickened to a grease consistency with the sodium soap of rapeseed oil having combined therein from 0.025% to 2% by weight of O,N-distearoyl-p-aminophenol.

7. A lubricating grease composition consisting essentially of a mineral lubricating oil thickened to a grease consistency with the sodium soap of rapeseed oil having combined therein from 0.025% to 2% by weight of O,N-dilauroyl-3-pentadecyl-p-aminophenol.

References Cited in the file of this patent
UNITED STATES PATENTS

| | | |
|---|---|---|
| 1,933,975 | Haller | Nov. 7, 1933 |
| 2,248,112 | Neustein | July 8, 1941 |
| 2,604,450 | Morway et al. | July 22, 1952 |
| 2,604,452 | Morway et al. | July 22, 1952 |
| 2,625,557 | Cottle et al. | Jan. 13, 1953 |
| 2,629,666 | Morway et al. | Feb. 24, 1953 |
| 2,642,397 | Morway et al. | June 16, 1953 |
| 2,654,722 | Young | Oct. 6, 1953 |